May 27, 1958 J. FUHRMANN ET AL 2,836,315
MATERIAL CONVEYING LIFT TRUCK
Filed March 5, 1956 4 Sheets-Sheet 1

INVENTORS
John Fuhrmann
John B. Stauss
by Popp and Sommer
ATTORNEYS.

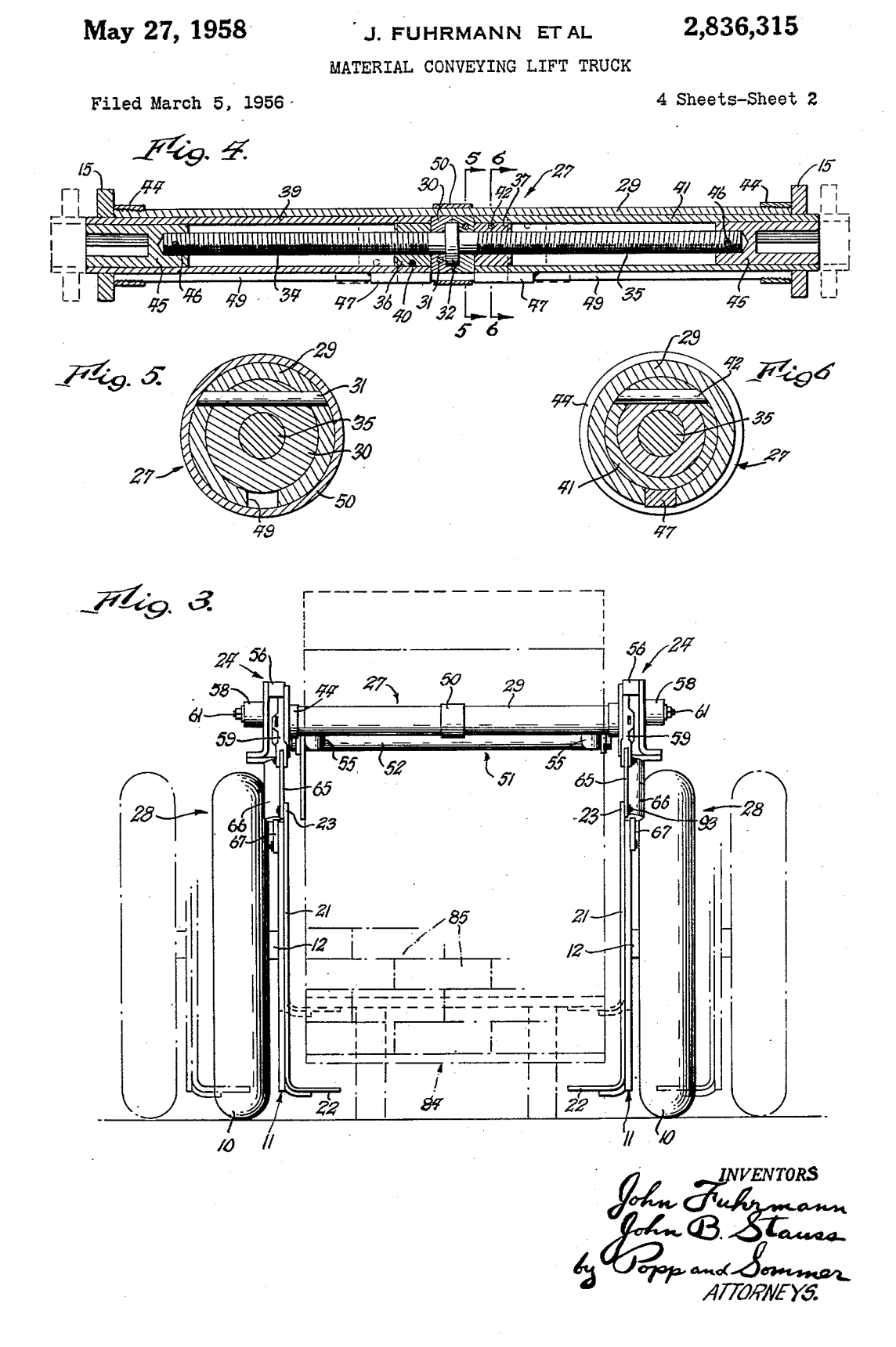

May 27, 1958     J. FUHRMANN ET AL     2,836,315
MATERIAL CONVEYING LIFT TRUCK

Filed March 5, 1956     4 Sheets-Sheet 2

May 27, 1958  J. FUHRMANN ET AL  2,836,315
MATERIAL CONVEYING LIFT TRUCK
Filed March 5, 1956  4 Sheets-Sheet 3
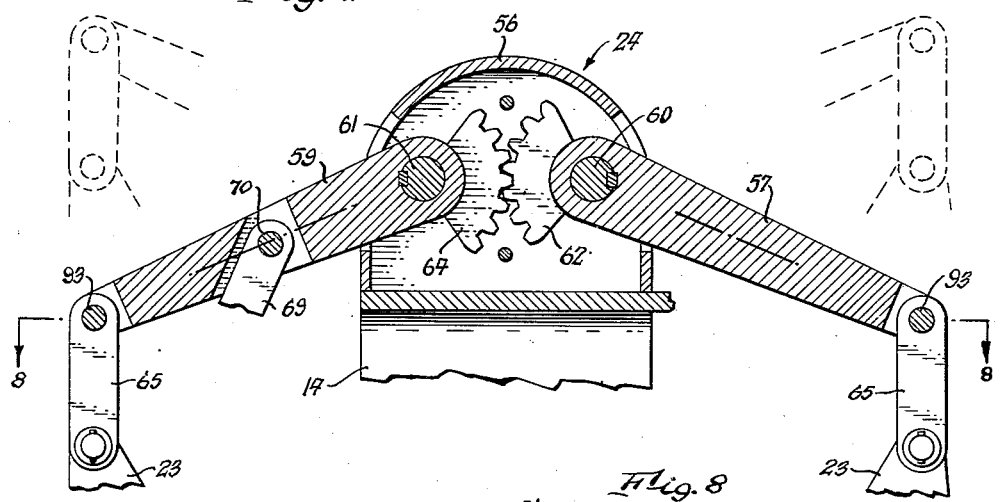
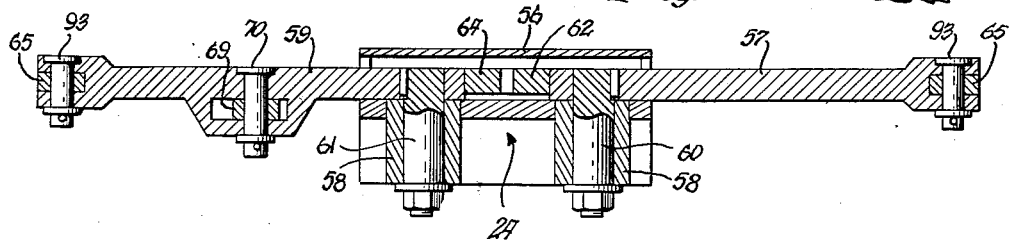
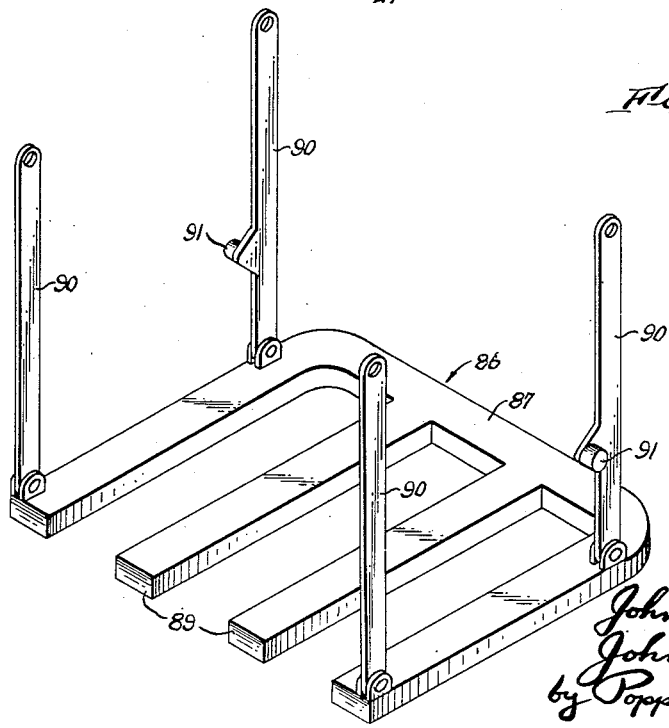
INVENTORS
John Fuhrmann
John B. Stauss
by Popp and Sommer
ATTORNEYS.

May 27, 1958 J. FUHRMANN ET AL 2,836,315
MATERIAL CONVEYING LIFT TRUCK
Filed March 5, 1956 4 Sheets-Sheet 4
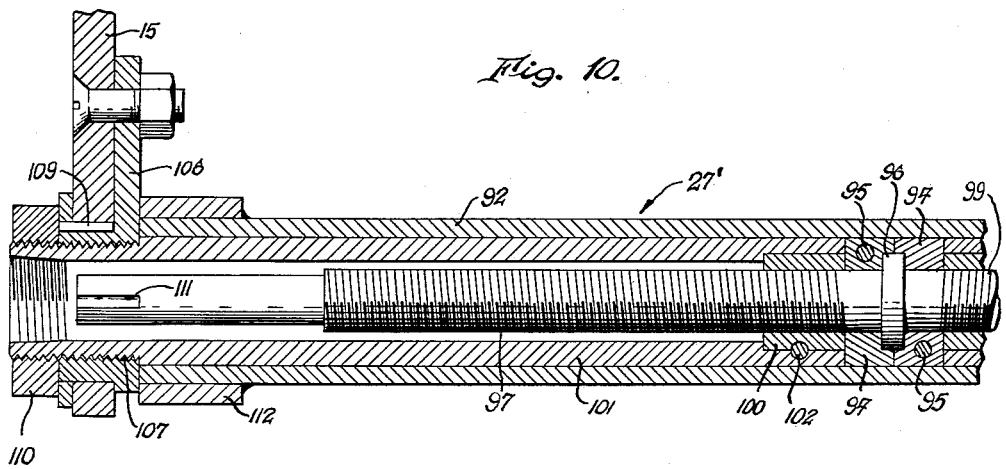
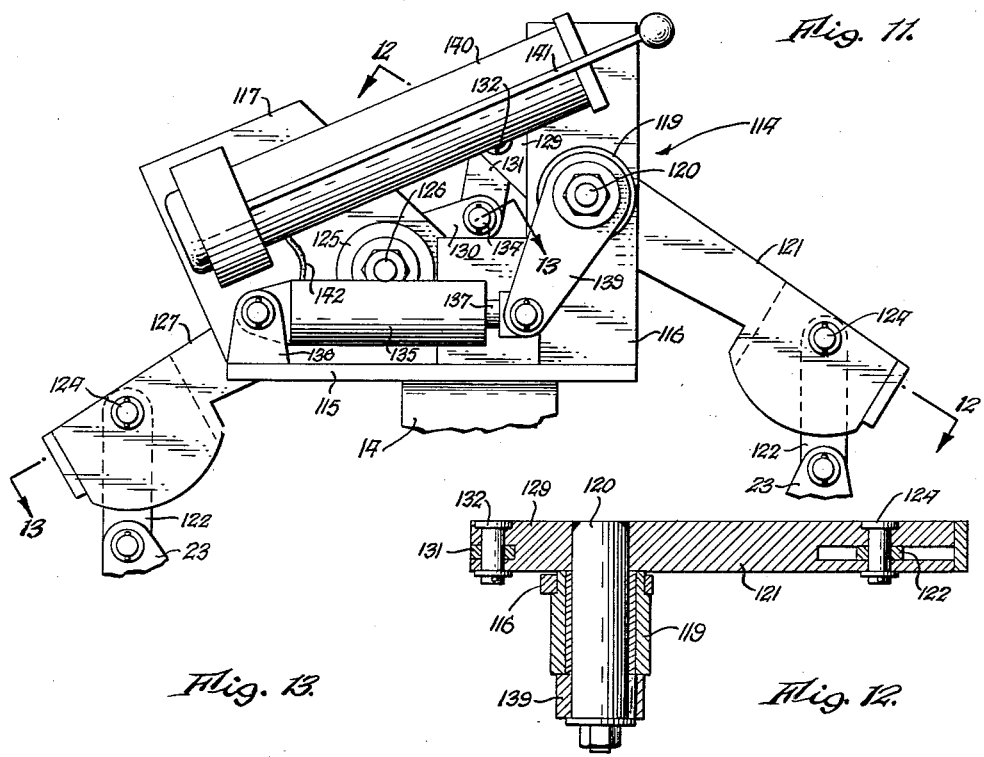
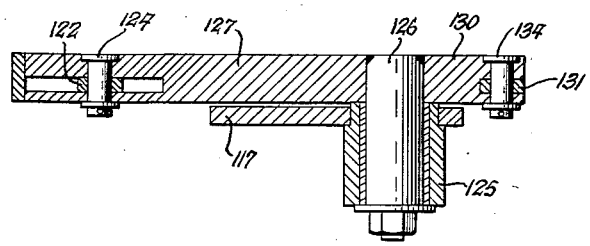
INVENTORS
John Fuhrmann
John B. Stauss
by Popp and Sommer
ATTORNEYS United States Patent Office 2,836,315
Patented May 27, 1958

2,836,315

MATERIAL CONVEYING LIFT TRUCK

John Fuhrmann, West Seneca, and John B. Stauss, Buffalo, N. Y.

Application March 5, 1956, Serial No. 569,539

6 Claims. (Cl. 214—390)

This invention relates to a truck for conveying materials and more particularly to a hand truck for building construction work in conveying pallets of brick, mortar and the like.

One of the principal objects of the present invention is to provide such a hand truck which can be used to convey heavy loads to any destination on a construction job and in particular can be pushed over rough ground, onto elevators, along scaffolding and temporary flooring, and through narrow doorways.

Another object is to provide such a truck which is particularly adapted to conveying pallets of brick and pallets of building tile and is capable of lifting such pallets, conveying such pallets to the point of use, and depositing the pallets at the point of use.

Another object is to provide a two-wheeled hand truck, of the type which straddles its load, of greatly simplified, lighter, and more economical construction.

Another object is to provide a two-wheeled truck of the type indicated which is stable both when loaded and unloaded, and which supports the load substantially centrally of the axles of the wheels.

Another object is to provide a two-wheeled load straddling truck in which lifting mechanisms are positioned on both sides of the truck generally over the wheels, thereby saving load carrying space and reducing the overall dimensions of the truck.

Other objects of the invention are the provision of a load straddling and lifting truck having strong light side frame members, and the provision of an improved adjustable cross member for connecting the opposite side frame members of the two side units of the truck so that the width of the load-carrying space of the truck may be varied as required.

Another object is to provide a compact, durable, and simple load lifting and guiding mechanism which insures that the load-supporting mechanism shall be maintained substantially horizontal at all times.

Another object is to provide a truck of the type indicated wherein the separate lifting mechanisms on the two sides of the truck have a single source of power, and are controlled so as to move simultaneously in the same direction and with equal lifting effort.

Another object is to provide a brake system for a truck of the type indicated, such brake system having brake operating means on a centrally located push handle and adjustable linkages connecting the operating means to brake shoes on the adjustable side units of the truck.

Another object is to provide such a hand truck which is sturdy and will stand up under conditions of severe and constant use without getting out of order.

Other objects and advantages of the invention will be apparent from the following description and drawings in which.

Figure 1:
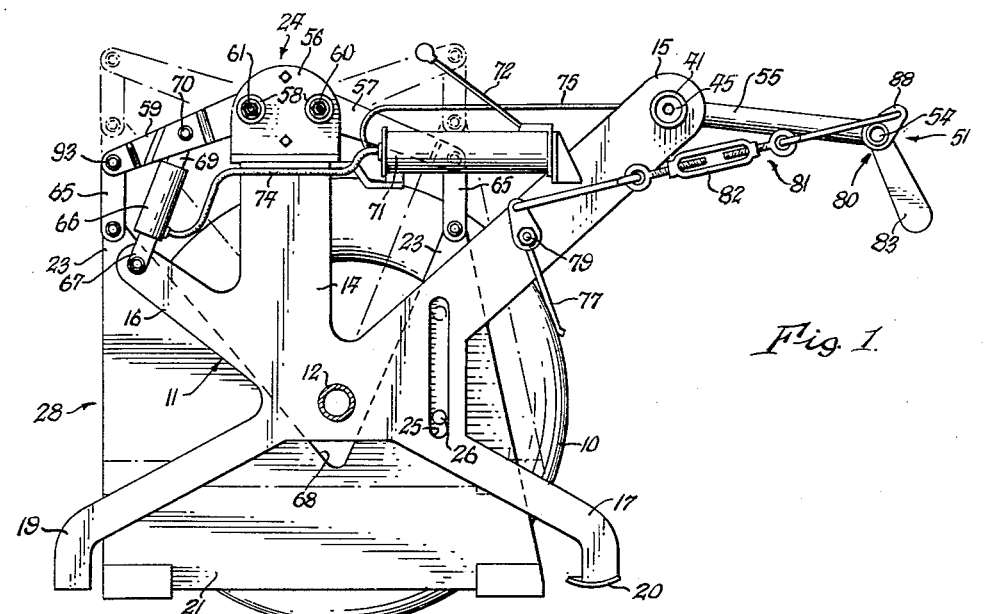
Fig. 1 is a side elevational view of a truck in accordance with the invention, parts of the load supporting and lifting mechanisms being shown in full lines in lowered position and in dot and dash lines in raised position, the wheel nearer the reader being broken away and the axle for such wheel being shown in vertical section.
Figure 2:
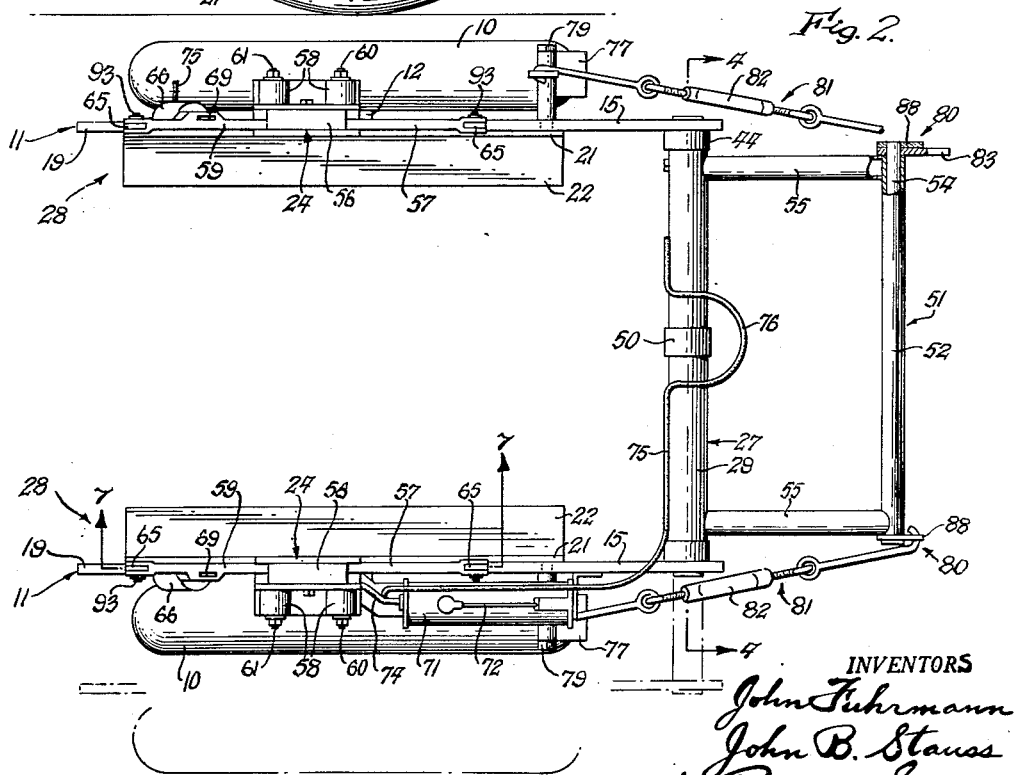
Fig. 2 is a top plan view of the truck of Fig. 1 with parts broken away to show construction of the handle.

Fig. 3 is a front elevational view of the truck shown in Figs. 1 and 2, parts of the load supporting mechanism being shown in full lines in lowered position and in broken lines in raised position supporting a pallet and load thereon, the pallet and load being shown in dot and dash lines. The figure also shows, in dot and dash lines, the wheels, side frame members, and parts of the load supporting members in outwardly adjusted positions thereof.

Fig. 4 is a view in vertical axial section taken on line 4—4, Fig. 2, through the cross member connecting the side frame members of the truck of Figs. 1, 2 and 3, parts of the cross member being shown in elevation.

Fig. 5 is an enlarged vertical transverse section through the cross member taken on line 5—5 of Fig. 4.

Fig. 6 is an enlarged vertical transverse section through the cross member taken on line 6—6 of Fig. 4.

Fig. 7 is an enlarged fragmentary vertical section showing a portion of a lifting mechanism, the section being taken generally along line 7—7 of Fig. 1, the lifting mechanism being shown in solid lines in lowered position, parts of the lifting mechanism being shown in dot and dash lines in raised position.

Fig. 8 is a view in section through the structure of Fig. 7, the section being taken generally along line 8—8, Fig. 7.

Fig. 9 is an isometric view of a load lifting and carrying fork, and of suspending links connected thereto, which may be employed in the truck in place of the load supporting mechanism and suspending links therefor shown in Figs. 1, 2 and 3.

Fig. 10 is an enlarged fragmentary view in longitudinal axial section through a second embodiment of cross member of the truck, certain parts being shown in elevation.

Fig. 11 is a fragmentary elevational view of a second embodiment of lifting mechanism for use in the truck.

Fig. 12 is a fragmentary section longitudinally through a first lever of the lifting mechanism of Fig. 11, the section being taken generally along line 12—12 of Fig. 11.

Fig. 13 is a fragmentary section longitudinally through a second lever of the lifting mechanism of Fig. 11, the section being taken generally along line 13—13 of Fig. 11.

As above indicated, Figs. 1–8, inclusive, illustrate a truck in accordance with the invention having a first type of load supporting mechanism, a first type of cross member, and a first type of lifting mechanism. Fig. 9 illustrates a second type load supporting mechanism for use in the truck; Fig. 10 shows a second embodiment of cross member which may be used in the truck; and Figs. 11–13, inclusive, show a second type of lifting mechanism with which the truck may be provided.

Proceeding now to the embodiment of the truck shown in Figs. 1–8, inclusive, as shown in Figs. 2 and 3 the truck is provided with two laterally spaced parallel wheels 10. Each wheel supports a vertically disposed side frame member 11, located inwardly of the wheel, by an axle 12. The side frame members 11, which are similar, have a vertical arm 14 displaced somewhat toward the front of the frame, a rearwardly and upwardly directed arm 15, and a shorter, forwardly and upwardly directed arm 16. Arms 14, 15 and 16 converge downwardly as shown to form generally a "broad V" shape. Each side frame member 11 has a downwardly and rearwardly directed leg 17, and a forwardly and downwardly directed leg 19, whereby the truck may stably rest, in either a forwardly or a rearwardly tipped position, upon the wheels 10 and the legs 17 or 19. A shoe 20 on the bottom of rear leg 17 functions as a skid when the truck is tilted rearwardly.

Positioned inwardly of each side frame member 11, as most clearly shown in Fig. 3, there is a vertical load supporting plate 21 having an inwardly and horizontally directed load supporting flange 22 thereon. Each load supporting plate 21 is lifted and supported by its individual lifting mechanism generally designated 24, supported on the top of the respective side frame member 11. Each plate 21 parallels and closely confronts the inner surface of its member 11, and thus is maintained in a vertical plane in its upward and downward travel. To prevent the plates 21 from swinging transverse to axle 12, each plate is further guided on the frame member by means of an outwardly directed horizontal pin 26 on plate 21, such pin traveling within the vertical slot 25 on the frame member, as shown in Fig. 1. Each wheel, side frame member, lifting mechanism and load supporting flange forms a unit designated generally as 28. Each plate 21 has an upwardly diverging V-shaped cut out portion 68, whereby the plate may clear the axle 12. The upper corners 23 of plate 21 are connected to lifting mechanism, to be described.

As shown in Figs. 2 and 3, the two side units 28 of the truck are connected only at the upper ends of arms 15 of the frame members, so as to present a load receiving space between the units of very substantial width, height and length. The cross member generally designated 27, which connects the upper ends of arms 15, is readily adjustable in length whereby the lateral spacing of the two units may be varied to receive loads of different widths between them, as indicated in Figs. 2 and 3.

The construction of cross member 27 is shown in detail in Figs. 4, 5 and 6. As there shown, member 27 has an outer tubular sheath 29 of fixed length. Within tube 29 and centrally thereof there is positioned a two-part central socket member 30, each half of the socket being retained in tube 29 by cross pin 31, as shown in Fig. 5. Member 30 provides a central circular cavity within which is held a central flange 32 of a double worm member having one threaded portion 34 and a similar, oppositely threaded portion 35. Socket 30 retains the double worm member centrally of tube 29 and against travel longitudinally thereof. A nut 36 is threadedly engaged upon portion 34 of the double worm member, and a similar nut 37 is disposed on portion 35 thereof. A sleeve 39, telescoped within tube 29, is affixed to nut 36 by cross pin 40. A similar sleeve 41, telescoped within tube 29, is secured to nut 37 by cross pin 42.

The outer end of each of sleeves 39 and 41 projects through an opening in the end of its respective arm 15 of a side frame member 11, and is secured thereto as by welding. An internally threaded sleeve member 44 is screwed onto each externally threaded end of the outer tube 29. Sleeves 39 and 41, and thus side frame members 11 of the truck, are adjusted toward and away from each other by turning the double ended worm member. This is accomplished, in the embodiment in Figs. 4, 5 and 6, by turning either of members 45, which slidingly fit within the sleeves 39 and 41 and which are secured to the respective ends of threaded shaft portions 34 and 35 by cross pins 46, as shown. Sleeves 39 and 41 are held from rotation relative to the outer tube 29 by means of a radially projecting key member 47 secured to each sleeve, such key member extending outwardly through a longitudinally extending slot 49 in the side wall of outer tube member 29. This slot 49 extends the full length of the tube so that the tube is, in effect, a longitudinally split tube. Cross member 27 is preferably provided with a short central sleeve 50, which serves not only as an aid in the visual centering of the load on the truck, but also retains the pins 31 against accidental withdrawal and loss.

Secured to cross member 27 is a truck push handle, generally designated 51. Handle 51 carries mechanism for simultaneously applying a brake, to be described, to each of wheels 10.

As shown in Figs. 2 and 3, handle 51 has a tubular body 52. The outer ends of member 52 are connected by similar longitudinally extending spaced parallel tubes 55 to the outer sleeve 29 of the cross member 27.

Each of side frame members 11 has pivoted to its arm 15, intermediate the length of the latter, a brake shoe 77 which has a portion overlying the tire of wheel 10. An arm of the brake shoe above its pivotal connection 79 is connected by an adjustable linkage 81, which includes a turnbuckle 82, to an arm 88 positioned on each of the respective ends of the push handle 51. Each brake is applied to the tire of its wheel when its brake operating arm 88 is turned clockwise as is shown in Fig. 1.

Preferably the push handle 51 includes means whereby both brakes may be applied simultaneously by the operation of a single brake applying handle 83. As shown in Fig. 2, the arms 88 and handle 83 are fastened to ends of a rod 54 extending centrally within the tube 52.

It will be seen that when brake handle 83 is turned about the axis of push handle 51, it not only operates the arm 88 nearest to the handle but also transmits its motion through the rod 54 to the arm 88 fastened to the opposite end thereof. Turnbuckles 82 are adjusted to provide the correct length of brake linkages 81 for each distance of spacing of units 28 from each other.

As indicated above, the truck is designed to straddle a load which it is to carry, following which the load is lifted by lifting mechanism on the truck. After the load has been conveyed to the desired point, it is then lowered and the truck is withdrawn from the load. In Fig. 3, there is shown a typical load in the form of a pallet 84 having a load of stacked bricks 85 thereon. The side units 28 of the truck are shown as having been adjusted so that a pallet and its load are received between the units. The pallet has overhanging edges so that lifting flanges 22 may be introduced below them.

The lifting mechanism located on each of the side units 28 of the truck is shown in detail in Figs. 1, 2, 7 and 8. A housing 56 is secured to the top of the vertical arm 14 of each of the side frame members 11. Such housing includes spaced horizontal parallel fixed bosses 58 which rotatably carry stub shafts 60 and 61. Shafts 60 and 61 carry, respectively, rearwardly and forwardly directed lever arms 57 and 59, which are caused to move upwardly and downwardly to an equal extent by meshing part-pinions 62 and 64 which are rigidly connected to said lever arms. The outer ends of lever arms 57 and 59 are connected to the respective upper corners 23 of plate 21 by means of depending links 65 and are pivotally connected to the links 65 by the pins 93. It will be seen that when lever arm 59 is rotated clockwise, as it is shown in Fig. 7, lever arm 57 will rotate counterclockwise to an equal extent, thereby maintaining flange 22 horizontal while moving plate 21 vertically.

Lever arm 59 is thrust upwardly, to raise plate 21, by a hydraulic thrust cylinder 66 having the base of its outer cylindrical housing portion 67 pivoted to forward arm 16 of the side frame member 11 as shown, and having the outer end of its piston rod 69 pivotally connected to lever arm 59 intermediate the ends of the latter by pivot pin 70.

The two hydraulic thrust cylinders 66 are supplied with fluid under pressure under the control of the operator. A hydraulic pump 71 is disposed at the top of one of the side units of the truck above the wheel thereof. Such pump, which is of conventional construction, has a pump operating lever 72 which also preferably functions to operate a delivery and release valve (not shown), as by turning the lever 72 in opposite directions. Fluid under pressure is delivered from pump 71 through branching conduits 74 and 75 to the respective thrust cylinders 66. As shown, conduit 75 extends rearwardly of one arm 15, then across member 29, and thence forwardly along the other arm 15 to the thrust motor 66 on the other side unit of the truck. A loop 76 is formed in conduit 75, as for instance intermediate the length of member 29, to provide sufficient length of conduit when the opposite side units of the truck are spaced most widely apart.

For some types of loads, it is preferred that an integral load supporting mechanism be employed rather than two unconnected lifting elements such as the above described flanges 22 of lifting plates 21. Accordingly, the lifting plates 21 may be replaced by an integral lifting member, such as the fork 86 shown in Fig. 9. When the truck is used with an integral load supporting mechanism, side units 28 are spaced apart a fixed predetermined distance.

Fork 86 has an integral U-shaped outer frame part 87, from the base of which there project forwardly the spaced horizontal arms 89. To support and lift fork 86 there are provided four long link members 90, which are pivoted generally at the four corners of the fork. The upper ends of links 90 are adapted to be connected by pivot pins 93 to the outer ends of lever arms 57 and 59 of the lifting mechanisms of truck units 28. To insure that fork 86 will travel vertically with respect to the side frame members, at least one of links 90 is provided with a horizontal outwardly projecting pin 91 which is adapted to be received in the vertical slot 25 in the side frame member. To reduce strain on the fork and links 90, it is preferred that both rear links 90 be provided with a pin 91 cooperating with the respective slot 25.

In Fig. 10, there is shown a cross member 27' which may be employed to connect the side frame members 11 of the truck as an alternative to member 27 above described.

Cross member 27' has an outer tube 92 within which halves 94 of a split socket are centrally retained in confronting relationship by cross pins 95. A double screw member is retained against longitudinal movement with respect to tube 92 by having a central flange 96 thereon received in the split socket, as shown. One end 97 of the double screw is threaded in one direction, and the other end 99 thereof is threaded in the opposite direction. Each screw portion is provided with a nut, nut 100 being shown threadedly engaging the screw portion 97. Attached to nut 100 by pin 102 is an inner sleeve 101 which is slidably mounted within tube 92. The outer end of sleeve 101 is threaded at 107 and makes connection with a screw threaded hub of member 106. An outwardly extending ear on member 106 is bolted to arm 15 of a side frame member 11. Parts 15 and 106 are connected by key member 109, and the thus combined structure of parts 15 and 106 are retained on sleeve 101 by nut 110.

Cross member 27' may be adjusted to increase its length from the minimum shown in Fig. 10 by engaging a socket type wrench with the outer end of either of the worm parts. The outer end of worm part 97 is shown provided with a groove 111 by which it may be engaged by a wrench. In the condition of minimum length of arm 27', the inner face of member 106 contacts a stop sleeve 112 welded on to the end of tube 92. If desired, the interior of the cross arm may be protected by a plug, not shown, which may be screwed into the outer end of sleeve 101.

In Figs. 11, 12 and 13, there is shown a lifting mechanism, generally designated 114, which may be employed in the truck of the invention in place of that above described. Such lifting mechanism is likewise supported on the top of the central vertical arm 14 of a side frame member 11. A horizontal supporting plate 115, secured to the top of arm 14, carries thereon vertical plate members 116 and 117. Affixed to plate 116 intermediate its height is a hollow boss 119 rotatably carrying within it a stub shaft 120. Secured to the stub shaft, as by being welded thereto, is a first, lower lever having a long rearwardly directed arm 121. The outer end of such arm is connected to the rear upper corner 23 of a lifting plate 21 by means of a depending link 122. Affixed to plate 117 is a boss-forming sleeve 125 which carries rotatably therewithin a stub shaft 126. Secured to the shaft, as by being welded thereto, is a second, lower lever having a forwardly directed arm 127. The forward end of such arm is connected to a forward corner 23 of lifting plate 21 by means of a depending link 122.

The first and second levers are connected together so that their outer ends travel equal distances vertically by a link 131 pivotally connected to the shorter centrally located arms 129 and 130 of the first and second levers, respectively, by pivot pins 132 and 134.

Lever arms 121 and 127 are raised, to raise a load supporting mechanism attached thereto, by means of a hydraulic thrust cylinder 135. The base of such cylinder is pivotally connected to a bracket 136 mounted on plate 115, piston rod 137 of such cylinder being pivotally connected to an arm 139 which is keyed to the outer end of shaft 120. When cylinder 135 is subjected to hydraulic pressure so as to thrust its piston rod 137 outwardly, lever arms 139 and 121 are rotated counterclockwise about the axis of stub shaft 120, and lever arm 127 is rotated clockwise about the axis of stub shaft 126.

Thrust cylinder 135, and the similar cylinder of the other lifting mechanism (not shown), on the other unit of the truck, are supplied with hydraulic fluid under pressure from pump 140. Such pump, which is similar to that shown at 71, is provided with a pump actuating lever 141 which also preferably actuates a delivery and release valve, not shown. Fluid under pressure is delivered from pump 140 through conduits such as that shown at 142 connected to thrust cylinder 135.

From the foregoing it will be seen that the present invention provides a rugged, simple, and stable hand truck of light construction for conveying material such as pallets of bricks or the like from the place where the pallets are deposited to the point of use. It will further be seen that the hand truck of the invention is fully adaptable to meet the various conditions encountered in building construction work such as rough terrain, the necessity for going through narrow doorways, the necessity for traveling along scaffolds, and the necessity for adapting the truck for loads of different widths.

We claim:

1. A material conveying lift truck, comprising a pair of spaced, parallel ground-engaging side wheels, a pair of spaced, parallel side frame members disposed inwardly of and close to each respective wheel, means supporting each side frame member on its associated side wheel, means connecting the side frame members, load supporting mechanism disposed between the side frame members for movement vertically with respect thereto, a lifting mechanism supported on each side frame member above and at least partially within the projected sides of its respective wheel, common drive means connecting the two lifting mechanisms, each lifting mechanism having a forwardly and a rearwardly directed arm, generally vertically disposed links connecting the ends of the arms to the forward and rear ends of the respective sides of the load supporting mechanism, and means for guiding the load supporting mechanism for generally vertical movement with respect to the side frame members.

2. A truck as set forth in claim 1 wherein the oppositely directed arms of each lifting mechanism are pivoted generally above the axis of its respective wheel, and there is means in each lifting mechanism for drivingly connecting such arms together.

3. A truck as set forth in claim 2 wherein the driven arms of each lifting mechanism are connected together by meshing pinions.

4. A truck as set forth in claim 2 wherein the driven oppositely directed arms of each lifting mechanism are parts of two first-class levers, one such lever is pivoted above the other so that the inner end of one lever lies above the inner end of the other, and such inner ends of the levers are connected by link means whereby the outer ends of the arms travel equal distances vertically.

5. A material conveying truck, comprising a pair of spaced, parallel ground-engaging side wheels, a pair of spaced, parallel side frame members disposed inwardly of and close to each respective wheel and each in the form of a spider having an upwardly projecting central arm, and forwardly and rearwardly projecting arms converging downwardly toward said central arm, means supporting each spider on its associated side wheel, a cross member connecting and extending between the rearwardly and upwardly directed arms of the respective side frame members, a load supporting mechanism disposed between said spiders for movement vertically with respect thereto, forwardly and rearwardly directed levers pivoted on said central arm of each spider, means connecting the pair of said levers at each side of the truck together for equal movement, a hydraulic thrust cylinder operatively interposed between one of said levers at each side of the truck and an arm of the corresponding spider, and means connecting each of said levers to the respective side of said lifting mechanism.

6. A hand propelled, two wheel material conveying lift truck, comprising a pair of spaced, parallel ground-engaging side wheels forming the sole wheeled support for the truck, a pair of spaced, parallel vertical side frame members, means supporting each side frame member on its associated side wheel, means connecting said side frame members, a load supporting mechanism disposed between said side frame members for movement vertically with respect thereto, a forwardly directed lever pivoted on each of said side frame members, a rearwardly directed lever pivoted on each of said side frame members in rear of the corresponding forwardly directed lever, a link connecting the forward end of each of said forwardly directed levers to said load supporting mechanism, a link connecting the rear end of each of said rearwardly directed levers to said load supporting mechanism, means interconnecting the pair of levers of each side frame member and compelling them to swing in unison, and manually operable means for moving the pairs of said levers of both of said side frame members in unison.

References Cited in the file of this patent

UNITED STATES PATENTS

| | | |
|---|---|---|
| 528,011 | McElfresh | Oct. 23, 1894 |
| 1,239,771 | Collis | Sept. 11, 1917 |
| 2,512,333 | Jaffa | June 20, 1950 |
| 2,527,412 | Green | Oct. 24, 1950 |
| 2,716,031 | Roessler | Aug. 23, 1955 |